US010967712B2

(12) United States Patent
Inagaki et al.

(10) Patent No.: US 10,967,712 B2
(45) Date of Patent: Apr. 6, 2021

(54) REGISTER PANEL MOUNTING STRUCTURE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Yuya Inagaki, Kariya (JP); Toshinao Wada, Miyoshi (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 292 days.

(21) Appl. No.: 15/422,565

(22) Filed: Feb. 2, 2017

(65) Prior Publication Data

US 2017/0225544 A1 Aug. 10, 2017

(30) Foreign Application Priority Data

Feb. 4, 2016 (JP) .............................. JP2016-020058

(51) Int. Cl.
*B60H 1/34* (2006.01)
*B60R 11/00* (2006.01)

(52) U.S. Cl.
CPC ............ *B60H 1/3407* (2013.01); *B60R 11/00* (2013.01); *B60R 2011/0005* (2013.01); *B60R 2011/0064* (2013.01)

(58) Field of Classification Search
CPC .................................................. B60H 1/3407
USPC ......... 248/346.04, 564, 567, 570, 614, 27.1, 248/27.3
See application file for complete search history.

(56) References Cited

U.S. PATENT DOCUMENTS

| 979,927 | A | * | 12/1910 | Brown | ................... | H01R 13/74 |
|---|---|---|---|---|---|---|
| | | | | | | 439/546 |
| 1,340,673 | A | * | 5/1920 | Roe | ....................... | B60H 1/3407 |
| | | | | | | 49/39 |
| 1,483,218 | A | * | 2/1924 | Fahnestock | ............ | H02G 3/083 |
| | | | | | | 174/153 G |
| 1,521,930 | A | * | 1/1925 | Colbie | ................... | B60K 37/00 |
| | | | | | | 248/27.1 |

(Continued)

FOREIGN PATENT DOCUMENTS

| JP | 2001-33861 A | 2/2001 |
|---|---|---|
| JP | 2003-072425 A | 3/2003 |
| JP | 2005-219595 A | 8/2005 |

*Primary Examiner* — Avinash A Savani
*Assistant Examiner* — Martha M Becton
(74) *Attorney, Agent, or Firm* — Sughrue Mion, PLLC

(57) ABSTRACT

A register panel mounting structure includes: a retainer having a cylindrical shape and having a flow path formed therein to permit passage of air for air conditioning; and a register panel mounted at an edge portion of the retainer, the edge portion forming an opening at a downstream side. The register panel has a shape only covering, from a front side, one portion of the edge portion in a circumferential direction. The register panel includes: an inner panel disposed at a side at which the opening is located when viewed from the edge portion; and an outer panel disposed opposite to the side at which the opening is located when viewed from the edge portion. The inner panel and the outer panel sandwich one portion of the edge portion in the circumferential direction.

4 Claims, 11 Drawing Sheets

(56) References Cited

U.S. PATENT DOCUMENTS

| | | | | |
|---|---|---|---|---|
| 1,666,569 A * | 4/1928 | Kelch | B60H 1/3407 | 454/152 |
| 1,731,199 A * | 10/1929 | Keeney | B60K 37/00 | 180/90 |
| 1,764,930 A * | 6/1930 | Byck | F21S 8/00 | 362/267 |
| 1,808,198 A * | 6/1931 | Zubaty | G01P 1/02 | 235/96 |
| 1,824,682 A * | 9/1931 | O'Neil | A47F 5/04 | 108/191 |
| 1,835,155 A * | 12/1931 | Harbert | F16L 3/00 | 248/56 |
| 1,888,847 A * | 11/1932 | Carlson | H02B 1/044 | 220/3.6 |
| 2,005,792 A * | 6/1935 | Leins | F24C 3/124 | 126/39 R |
| 2,047,838 A * | 7/1936 | Smith | H02K 5/24 | 361/212 |
| 2,209,146 A * | 7/1940 | Bessette | H02G 3/123 | 220/3.9 |
| 2,607,228 A * | 8/1952 | Coxon | G01L 7/084 | 73/715 |
| 2,678,227 A * | 5/1954 | Niemeyer | G05G 23/00 | 403/247 |
| 2,745,275 A * | 5/1956 | Jacobi | G01D 11/305 | 70/370 |
| 3,096,654 A * | 7/1963 | Du Bois | G01D 11/24 | 73/431 |
| 3,152,480 A * | 10/1964 | Hoff, Jr. | G01D 11/24 | 73/431 |
| 3,166,941 A * | 1/1965 | Waite | G01D 11/24 | 73/431 |
| 3,200,732 A * | 8/1965 | Chantiles | B60H 1/3407 | 454/152 |
| 3,205,712 A * | 9/1965 | Hoff, Jr. | G01D 11/30 | 73/431 |
| 3,276,347 A * | 10/1966 | Snyder | F24F 13/065 | 454/154 |
| 3,358,136 A * | 12/1967 | Greasley | B60Q 3/10 | 362/382 |
| 3,456,571 A * | 7/1969 | Kelly | B60H 1/3407 | 454/145 |
| 3,537,322 A * | 11/1970 | Bohenek | G01D 11/30 | 73/431 |
| 3,562,847 A * | 2/1971 | Jemison | H02G 3/083 | 16/2.1 |
| 3,648,591 A * | 3/1972 | Winnett | B60H 1/3407 | 454/158 |
| 3,655,154 A * | 4/1972 | Orts | H02G 3/123 | 248/27.1 |
| 3,672,291 A * | 6/1972 | Kujawa, Jr. | B60H 1/26 | 454/145 |
| 3,681,593 A * | 8/1972 | Genovese | F21V 19/008 | 439/237 |
| 3,793,563 A * | 2/1974 | Brefka | H02B 1/048 | 361/627 |
| 3,794,278 A * | 2/1974 | Frey, Jr. | F16L 5/00 | 248/27.3 |
| 3,806,721 A * | 4/1974 | Murphy, Jr. | B60Q 1/2626 | 362/549 |
| 3,830,454 A * | 8/1974 | Debaigt | H02G 3/10 | 248/27.1 |
| 3,871,606 A * | 3/1975 | Larson | G01D 11/305 | 248/27.1 |
| 3,942,226 A * | 3/1976 | Barnett | B60Q 11/00 | 24/682.1 |
| 4,032,725 A * | 6/1977 | McGee | H04R 1/025 | 381/395 |
| 4,053,082 A * | 10/1977 | Ullman | H02G 3/123 | 220/3.6 |
| 4,070,559 A * | 1/1978 | Piber | H02B 1/048 | 174/153 G |
| 4,086,483 A * | 4/1978 | Freund | B60Q 3/14 | 174/153 G |
| 4,092,907 A * | 6/1978 | Meyer | B60H 1/24 | 251/352 |
| 4,112,282 A * | 9/1978 | Piber | H02B 1/048 | 174/153 G |
| 4,117,772 A * | 10/1978 | Specht | B60H 1/267 | 454/145 |
| 4,156,804 A * | 5/1979 | Piber | H02B 1/048 | 174/153 R |
| 4,192,477 A * | 3/1980 | Decky | F16L 5/00 | 16/2.1 |
| 4,220,808 A * | 9/1980 | Fujita | H02B 1/048 | 174/490 |
| 4,277,653 A * | 7/1981 | Pawelzick | H04R 1/025 | 181/150 |
| 4,300,248 A * | 11/1981 | Dworkin | A47K 5/05 | 248/27.3 |
| 4,306,376 A * | 12/1981 | Strassacker | A47G 7/06 | 248/346.04 |
| 4,413,797 A * | 11/1983 | Donkervoort | G01D 11/305 | 248/27.1 |
| 4,451,720 A * | 5/1984 | Ludwig | H02B 1/048 | 200/296 |
| 4,457,672 A * | 7/1984 | Ogura | F04D 25/10 | 248/27.1 |
| 4,458,552 A * | 7/1984 | Spease | F16C 1/103 | 248/27.3 |
| 4,527,048 A * | 7/1985 | Comerford | B60N 3/14 | 219/265 |
| 4,546,850 A * | 10/1985 | Litner | H04R 1/025 | 181/141 |
| 4,550,230 A * | 10/1985 | Johnson | H04R 1/023 | 181/199 |
| 4,550,944 A * | 11/1985 | Simon | B60K 37/04 | 296/70 |
| 4,568,243 A * | 2/1986 | Schubert | F04D 29/023 | 248/570 |
| 4,583,448 A * | 4/1986 | Sasaki | B60H 1/34 | 454/127 |
| 4,586,843 A * | 5/1986 | Heng | H02B 1/048 | 403/252 |
| 4,640,478 A * | 2/1987 | Leigh-Monstevens | B60T 11/16 | 248/27.1 |
| 4,678,879 A * | 7/1987 | Kenway | H02B 1/044 | 200/295 |
| 4,685,035 A * | 8/1987 | Nanjoh | H02B 1/044 | 174/58 |
| 4,699,341 A * | 10/1987 | Ponticelli | B60K 35/00 | 248/27.1 |
| 4,702,711 A * | 10/1987 | Falchi | H02B 1/044 | 439/546 |
| 4,715,569 A * | 12/1987 | Essig | H02B 1/044 | 200/295 |
| 4,736,924 A * | 4/1988 | Bednar | G01D 11/30 | 248/27.1 |
| 4,778,134 A * | 10/1988 | Struthers | H04R 1/026 | 248/27.1 |
| 4,784,357 A * | 11/1988 | Kimura | B60K 37/04 | 248/27.1 |
| 4,804,197 A * | 2/1989 | Drbal | H01R 4/308 | 174/665 |
| 4,812,133 A * | 3/1989 | Fleak | H01R 13/6315 | 439/248 |
| 4,820,180 A * | 4/1989 | Mosquera | H01R 13/6315 | 248/27.3 |
| 4,860,791 A * | 8/1989 | Putnam | D06F 39/12 | 137/565.01 |
| 4,903,581 A * | 2/1990 | Nilsson | B60H 1/247 | 454/124 |
| 4,919,369 A * | 4/1990 | Stehn | H04N 5/642 | 181/172 |
| 5,101,129 A * | 3/1992 | Butcher | H01H 71/0264 | 174/153 G |

(56) References Cited

U.S. PATENT DOCUMENTS

| | | | | |
|---|---|---|---|---|
| 5,106,039 A | * | 4/1992 | Gross | B60R 11/0205 248/27.1 |
| 5,161,428 A | * | 11/1992 | Petruccello | F16C 1/226 192/111.12 |
| 5,162,018 A | * | 11/1992 | Horton | B60H 1/3407 251/100 |
| 5,259,641 A | * | 11/1993 | Schenk | B60R 21/217 280/731 |
| 5,306,973 A | * | 4/1994 | Butcher | H01H 71/0264 174/153 G |
| 5,397,267 A | * | 3/1995 | Vecellio | B60H 1/3428 454/155 |
| 5,406,032 A | * | 4/1995 | Clayton | H02G 3/083 174/151 |
| 5,487,558 A | * | 1/1996 | Ball | B60H 1/3407 280/728.3 |
| 5,746,651 A | * | 5/1998 | Arajs | B60H 1/3442 454/154 |
| 5,813,636 A | * | 9/1998 | Lollis | B60K 37/02 248/231.9 |
| 5,921,860 A | * | 7/1999 | Marsden | B60H 1/3414 454/152 |
| 5,971,558 A | * | 10/1999 | Peel | G01D 11/28 362/23.15 |
| 6,149,513 A | * | 11/2000 | Lyu | B60H 1/00378 454/108 |
| 6,176,775 B1 | * | 1/2001 | Volk | B60H 1/3414 454/154 |
| 6,364,760 B1 | * | 4/2002 | Rooney | B60H 1/3442 454/154 |
| 6,481,682 B2 | * | 11/2002 | Miura | F16B 5/0635 24/297 |
| 6,607,233 B1 | * | 8/2003 | Beaver | B60J 3/023 248/27.3 |
| 6,645,065 B2 | * | 11/2003 | Rooney | B60H 1/3442 454/154 |
| 6,669,160 B2 | * | 12/2003 | Steinmetz | G01K 11/28 248/346.01 |
| 6,676,176 B1 | * | 1/2004 | Quandt | E05B 9/08 292/202 |
| 6,709,280 B1 | * | 3/2004 | Gretz | H02G 3/06 174/652 |
| 6,808,413 B2 | * | 10/2004 | Plant | H01R 13/625 439/34 |
| 7,036,865 B2 | * | 5/2006 | Sato | B60K 37/02 296/70 |
| 7,045,714 B1 | * | 5/2006 | Kiely | H01R 13/745 174/666 |
| 7,064,273 B1 | * | 6/2006 | Kiely | H01R 13/745 174/153 R |
| 7,077,452 B2 | * | 7/2006 | Song | B60H 1/3407 180/90 |
| 7,566,261 B2 | * | 7/2009 | Ono | B60H 1/3428 454/155 |
| 7,753,423 B2 | * | 7/2010 | Zellner, Jr. | B60R 13/0206 248/27.3 |
| 7,777,639 B2 | * | 8/2010 | Young | B60K 35/00 340/691.1 |
| 7,819,728 B2 | * | 10/2010 | Beckley | B60H 1/3407 220/822 |
| 8,376,303 B2 | * | 2/2013 | Yang | F16M 13/00 248/346.04 |
| 8,434,809 B2 | * | 5/2013 | Young | B60K 37/02 296/70 |
| 8,480,461 B2 | * | 7/2013 | Gruenberg | B60H 1/00564 454/152 |
| 8,602,852 B2 | * | 12/2013 | Sawada | B60H 1/3428 454/143 |
| 8,616,608 B1 | * | 12/2013 | Porcs | B60R 13/0256 296/1.08 |
| 8,678,460 B2 | * | 3/2014 | Stachura | B60R 13/02 296/24.4 |
| 8,678,466 B2 | * | 3/2014 | Merkel | B60K 37/00 296/70 |
| 8,740,677 B2 | * | 6/2014 | Steinbeiss | B60H 1/3442 454/154 |
| 8,777,290 B1 | * | 7/2014 | Boese | B60K 37/02 296/70 |
| 9,051,010 B2 | * | 6/2015 | Young | B60K 37/02 |
| 9,500,092 B2 | * | 11/2016 | Errick | B60H 1/3407 |
| 9,849,754 B2 | * | 12/2017 | Kim | B60H 1/249 |
| 9,963,016 B2 | * | 5/2018 | Uehara | B60H 1/3442 |
| 10,065,475 B2 | * | 9/2018 | Humburg | B60H 1/00457 |
| 10,363,819 B2 | * | 7/2019 | Sowles | B60K 37/04 |
| 2001/0021634 A1 | * | 9/2001 | Elliot | B60H 1/242 454/121 |
| 2004/0089007 A1 | * | 5/2004 | Umebayashi | B60H 1/247 62/244 |
| 2006/0052050 A1 | * | 3/2006 | Malott | B60H 1/3407 454/307 |
| 2006/0103162 A1 | * | 5/2006 | Song | B60H 1/3407 296/70 |
| 2006/0201273 A1 | * | 9/2006 | Beckley | B60H 1/3407 74/473.3 |
| 2011/0092149 A1 | * | 4/2011 | Spamer | B60H 1/3428 454/155 |
| 2011/0111685 A1 | * | 5/2011 | Benamira | B60H 1/3442 454/155 |
| 2011/0217915 A1 | * | 9/2011 | Sawada | B60H 1/3428 454/162 |
| 2012/0122387 A1 | * | 5/2012 | Nicola | B60H 1/3428 454/155 |
| 2012/0153114 A1 | * | 6/2012 | Yang | H04M 1/04 248/346.04 |
| 2014/0301832 A1 | * | 10/2014 | Errick | B60H 1/3407 415/151 |
| 2014/0342651 A1 | * | 11/2014 | Humburg | B60H 1/3407 454/143 |
| 2015/0202946 A1 | * | 7/2015 | Inagaki | B60H 1/3428 454/154 |
| 2015/0321540 A1 | * | 11/2015 | Kim | B60H 1/249 454/152 |
| 2019/0009650 A1 | * | 1/2019 | Yueksel | B60H 1/3414 |

\* cited by examiner

REGISTER PANEL MOUNTING STRUCTURE

This nonprovisional application is based on Japanese Patent Application No. 2016-020058 filed on Feb. 4, 2016 with the Japan Patent Office, the entire contents of which are hereby incorporated by reference.

BACKGROUND OF THE INVENTION

Field of the Invention

The present invention relates to a structure for mounting a register panel at the outer circumference of an opening of a register provided in an instrument panel.

Description of the Background Art

As disclosed in Japanese Patent Laying-Open No. 2005-219595 and Japanese Patent Laying-Open No. 2003-072425, a structure for mounting a register panel at the outer circumference of an opening (air outlet) of a register provided in an instrument panel has been known. FIG. 10 shows a general mounting structure 10Z for a register panel 4 when viewed from a front side. FIG. 11 is a cross sectional view taken along a XI-XI line in FIG. 10.

With reference to FIG. 10 and FIG. 11, in the mounting structure 10Z for the register panel 4, the register panel 4 is mounted at an instrument panel 1. The register panel 4 is located adjacent to and at the left side of an indicator 3 (FIG. 10) provided in a center console, and has a lengthwise shape as a whole. Although not shown in the figures, the same mounting structure for the register panel 4 as that shown in FIG. 10 and FIG. 11 is also employed to be located adjacent to and at the right side of the indicator 3.

With reference to FIG. 11, more specifically, a retainer 12 having a cylindrical shape is provided at the backside of the instrument panel 1 (register panel 4). In an inner side of the retainer 12, a flow path 13 (FIG. 11) configured to permit passage of air for air conditioning is formed. The register panel 4 is disposed to cover an edge portion 15 of the retainer 12 from the front side, the edge portion 15 forming an opening 14 at a downstream side.

In an inner side of the edge portion 15 of the retainer 12, a fin 2 is disposed to be pivotable. The register panel 4 has a clip portion 4T, which has a shape extending toward a forward side (upper side in the plane of sheet of FIG. 11) in a vehicle forward/rearward direction (upward/downward direction in the plane of sheet of FIG. 11).

The instrument panel 1 includes a base material portion 6 (FIG. 11) composed of a resin, in addition to a design portion of the instrument panel 1 exposed at the front side. The base material portion 6 is disposed at the forward side relative to the design portion in the vehicle forward/rearward direction (disposed behind the design portion). The base material portion 6 is provided with an opening 6H.

The clip portion 4T of the register panel 4 is inserted into the opening 6H of the base material portion 6, and is engaged with the outer circumferential portion of the opening 6H. By the engagement, the register panel 4 is positioned and is fixed to the instrument panel 1. It should be noted that the clip portion 4T is provided to extend in a vehicle width direction, and the design portion of the register panel 4 at the front side has a width having a substantially size L1 (see FIG. 1 and FIG. 2) in the vehicle width direction.

SUMMARY OF THE INVENTION

With reference to FIG. 11, surface portions R1, R2 of the register panel 4 located at the front side may be configured to have different colors or different patterns depending on a specification. In order to provide such different colors in the register panel 4 used in the mounting structure 10Z, a parting line 5 in the form of a groove needs to be provided between the surface portions R1, R2 since a portion of the register panel 4 constituting the surface portion R1 is constructed in one piece with a portion of the register panel 4 constituting the surface portion R2.

The present invention has an object to provide a new register panel mounting structure configured to provide different colors and patterns in surface portions of a register panel located at a front side, even though no parting line in the form of a groove is deliberately provided in the surface portions of the register panel located at the front side.

A register panel mounting structure according to the present invention includes: a retainer having a cylindrical shape and having a flow path formed therein to permit passage of air for air conditioning; and a register panel mounted at an edge portion of the retainer, the edge portion forming an opening at a downstream side, the register panel having a shape only covering, from a front side, one portion of the edge portion in a circumferential direction, the register panel including an inner panel disposed at a side at which the opening is located when viewed from the edge portion, and an outer panel disposed opposite to the side at which the opening is located when viewed from the edge portion, the inner panel and the outer panel sandwiching the one portion of the edge portion in the circumferential direction.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
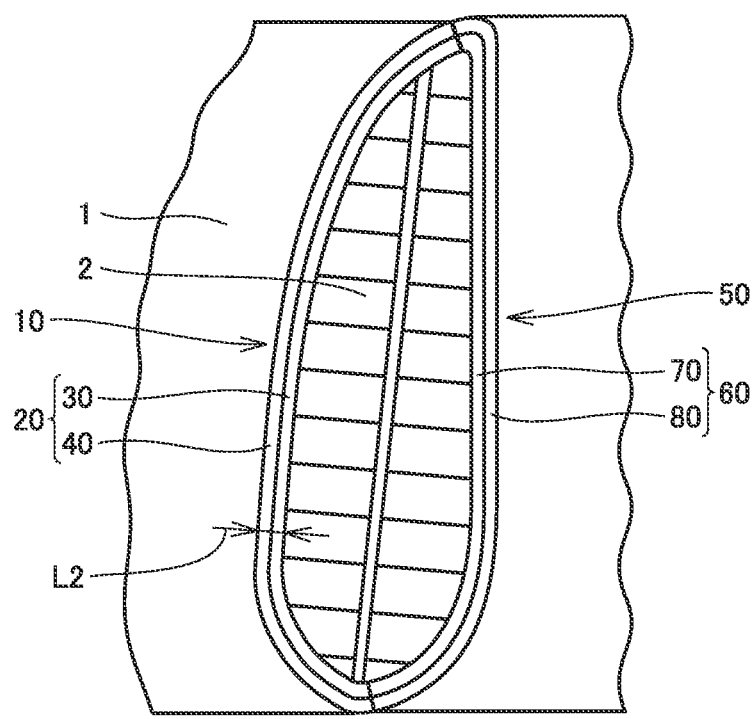
FIG. 1 shows a register panel mounting structure in an embodiment when viewed from a front side.
Figure 2:
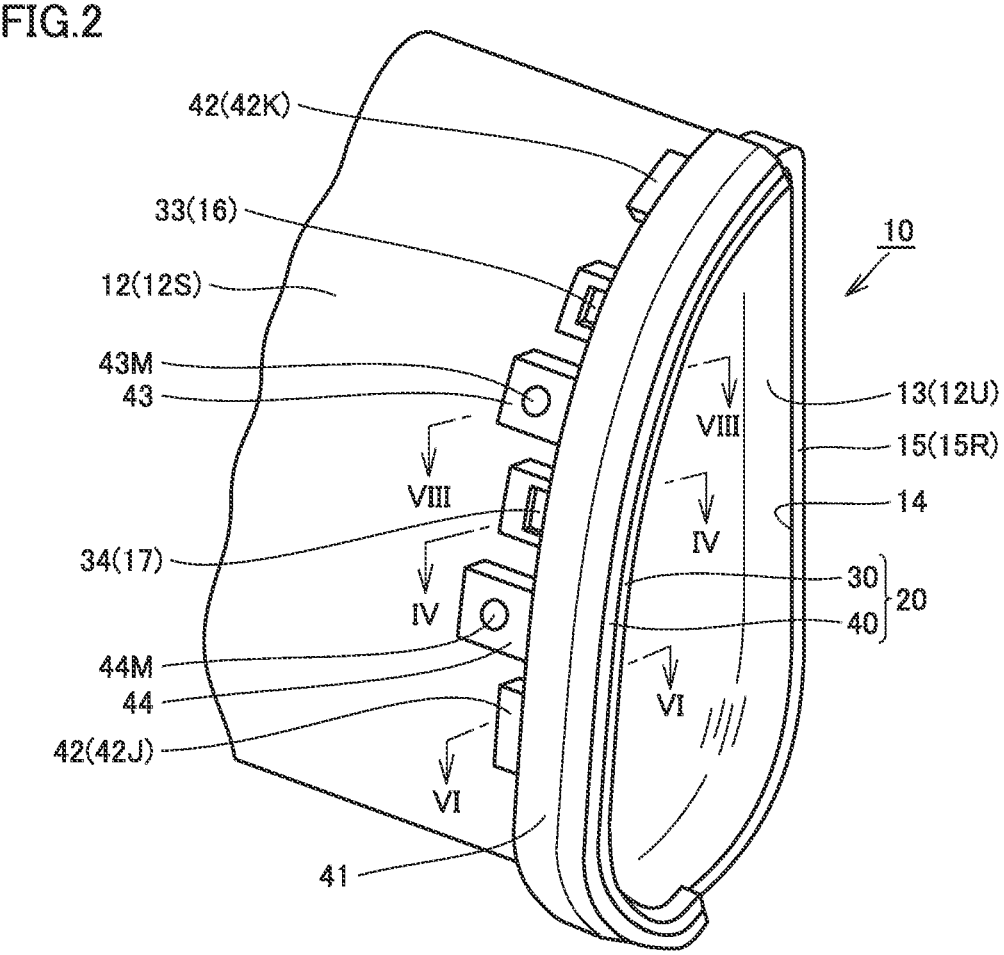
FIG. 2 is a perspective view showing that an instrument panel, a fin, and a register panel (register panel 60) are removed from an edge portion of a retainer in the mounting structure shown in FIG. 1.

The following describes an embodiment with reference to figures. The same and equivalent components are given the same reference characters and may not be described repeatedly. FIG. 1 shows a register panel mounting structure 10 in the embodiment when viewed from a front side. FIG. 2 is a perspective view showing that an instrument panel 1, a fin 2, and a register panel 60 are removed from an edge portion 15 (FIG. 2) of a retainer 12 (FIG. 2) in the mounting structure 10 shown in FIG. 1.

With reference to FIG. 1 and FIG. 2, in the register panel mounting structure 10, the retainer 12 (FIG. 2), which has a cylindrical shape, is provided at the backside of the instrument panel 1 (FIG. 1). In an inner side 12U (see FIG. 4) of the retainer 12, a flow path 13 (FIG. 2) configured to permit passage of air for air conditioning is formed.

Figure 3:
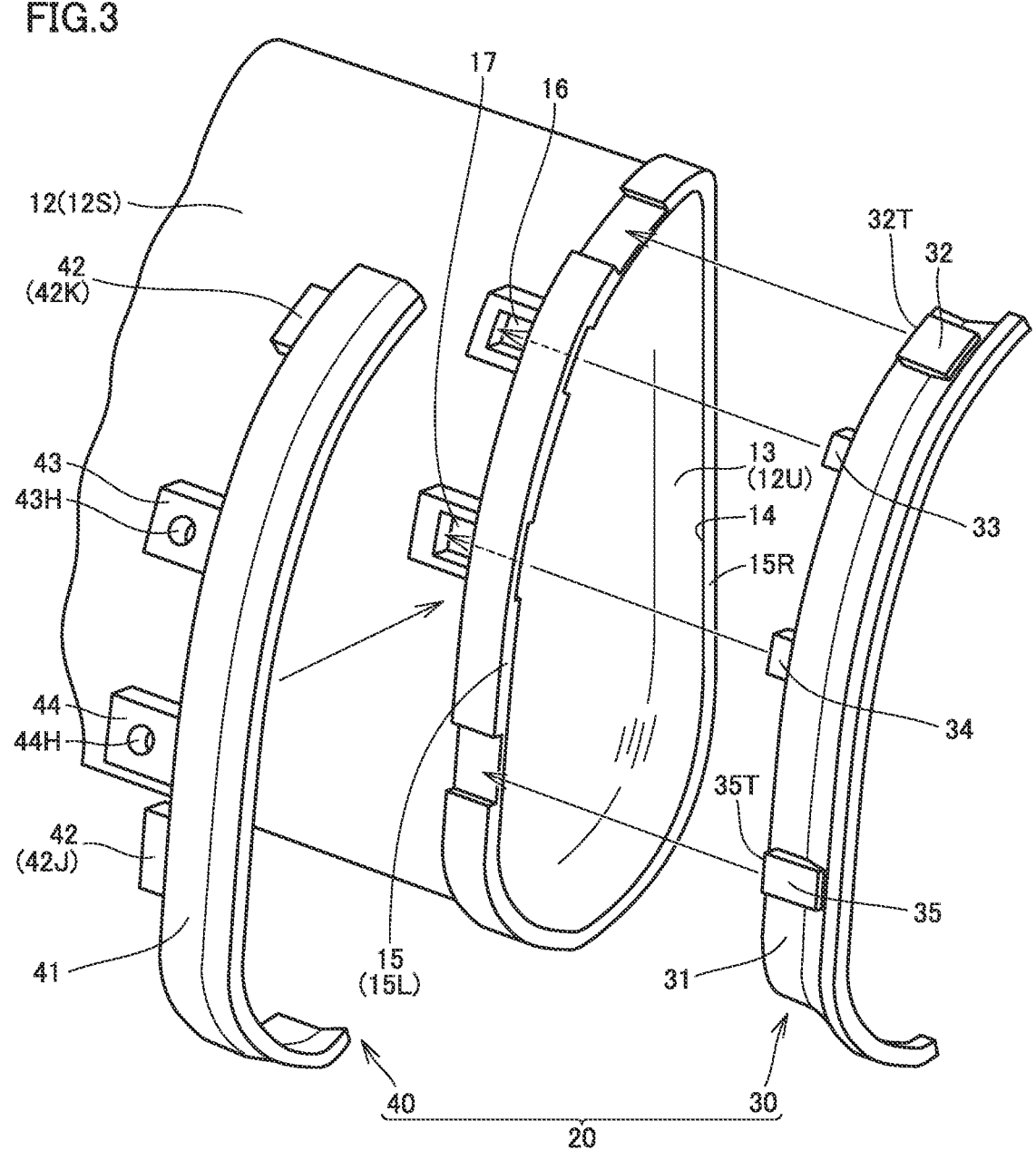
FIG. 3 is a perspective view showing that an inner panel and an outer panel are removed from the edge portion of the retainer in the mounting structure shown in FIG. 2.

The edge portion 15 of the retainer 12, which forms an opening 14 at a downstream side, has an annular shape extending in a circumferential direction (also see FIG. 3). FIG. 2 shows that only a portion 15R, which is substantially the right half of the edge portion 15, is exposed. FIG. 3 shows that the left half portion (one portion 15L) of the edge portion 15 is also exposed in addition to the right half portion 15R. In the present embodiment, the edge portion 15 of the retainer 12 has a lengthwise annular shape (substantially elliptical shape) as a whole. In an inner side of the edge portion 15 of the retainer 12 at the downstream side, a fin 2 (FIG. 1) is disposed to be pivotable.

In the present embodiment, the register panel mounting structure 10 and a register panel mounting structure 50 (FIG. 1) are applied to the edge portion 15 of the one retainer 12. The register panel mounting structure 10 is configured to mount a register panel 20 at the edge portion 15 (one portion 15L) of the retainer 12. The register panel mounting structure 50 is configured to mount the register panel 60 at the edge portion 15 (remainder portion 15R) of the retainer 12.

The register panel 20 has a lengthwise C-like shape as a whole, and only covers, from the front side, the one portion 15L (see FIG. 3) of the edge portion 15 of the retainer 12 in the circumferential direction. In the present embodiment, the register panel 20 has a shape to cover substantially the left half of the edge portion 15 when viewed in a front view. On the other hand, the register panel 60 has a reversed lengthwise C-like shape as a whole, and covers, from the front side, the remainder portion 15R (see FIG. 3) of the edge portion 15 of the retainer 12 in the circumferential direction. When viewed in a front view, the register panel 60 has a shape to cover substantially the right half of the edge portion 15.

The register panel 20 includes an inner panel 30 and an outer panel 40, which are prepared as different members, and is configured as an assembly constituted of the two panels. The inner panel 30 is disposed at a side at which the opening 14 is located (inner side of the opening 14 of the retainer 12) when viewed from the edge portion 15, whereas the outer panel 40 is disposed opposite to the side at which the opening 14 is located when viewed from the edge portion 15.

Likewise, the register panel 60 includes an inner panel 70 and an outer panel 80, which are prepared as different members, and is configured as an assembly constituted of the two panels. The inner panel 70 is disposed at the side at which the opening 14 is located (inner side of the opening 14 of the retainer 12) when viewed from the edge portion 15, whereas the outer panel 80 is disposed opposite to the side at which the opening 14 is located when viewed from the edge portion 15.

Figure 4:
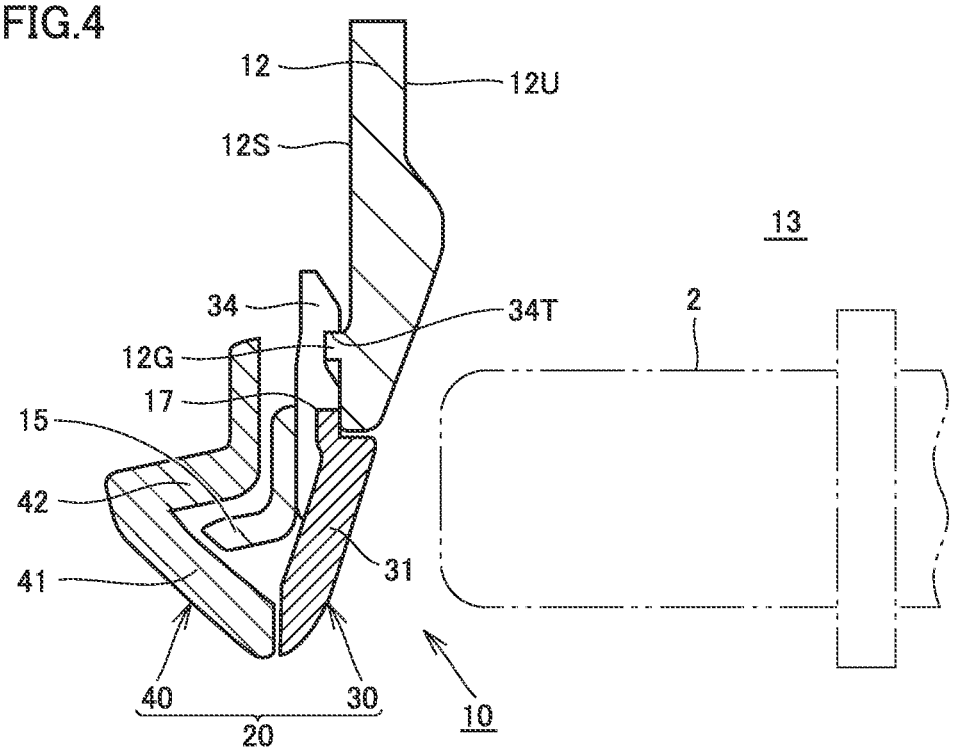
FIG. 4 is a cross sectional view taken along an IV-IV line in FIG. 2.
Figure 5:
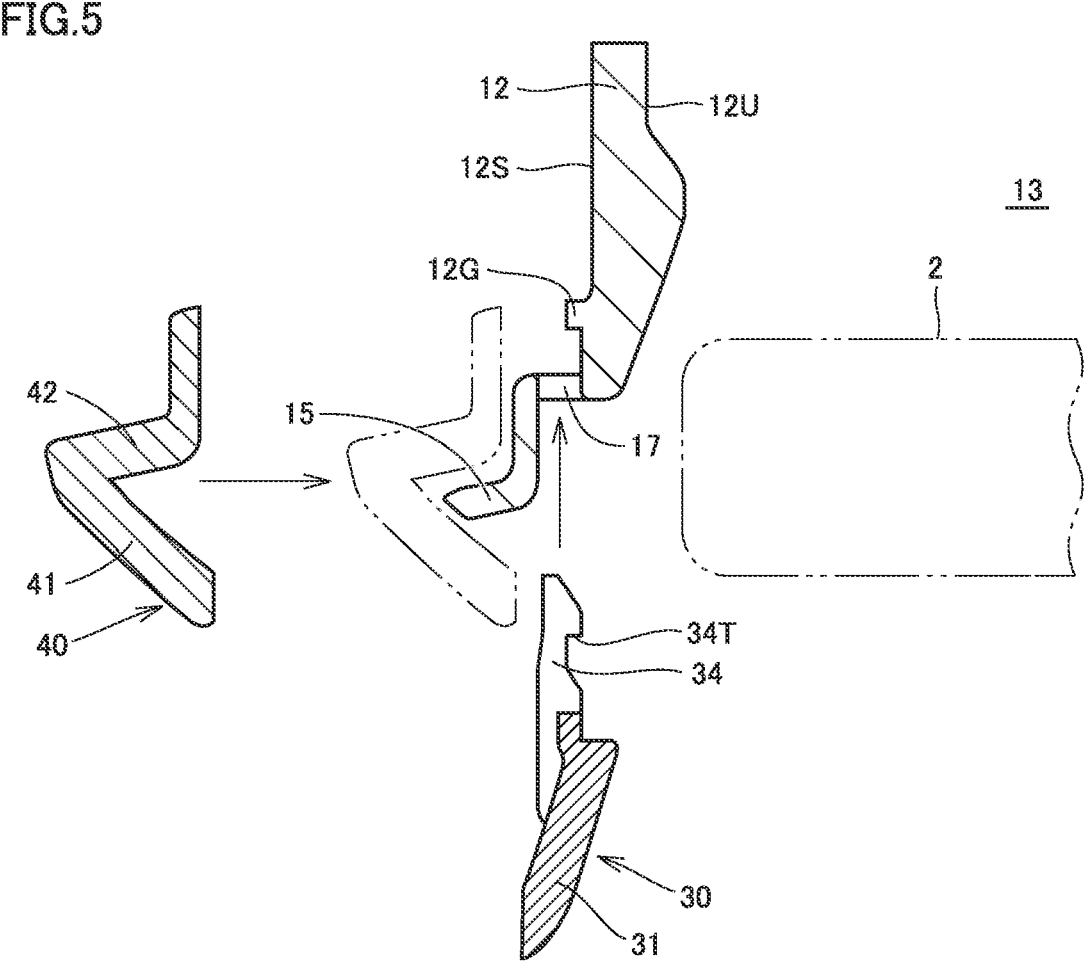
FIG. 5 is a cross sectional view showing that the inner panel and the outer panel are removed from the edge portion (one portion) of the retainer in the mounting structure shown in FIG. 4.

FIG. 3 is a perspective view showing that the inner panel 30 and the outer panel 40 are removed from the edge portion 15 of the retainer 12 in the mounting structure 10 shown in FIG. 2. FIG. 4 is a cross sectional view taken along an IV-IV line in FIG. 2. FIG. 5 is a cross sectional view showing that the inner panel 30 and the outer panel 40 are removed from the edge portion 15 (one portion 15L) of the retainer 12 in the mounting structure 10 shown in FIG. 4.

Figure 6:
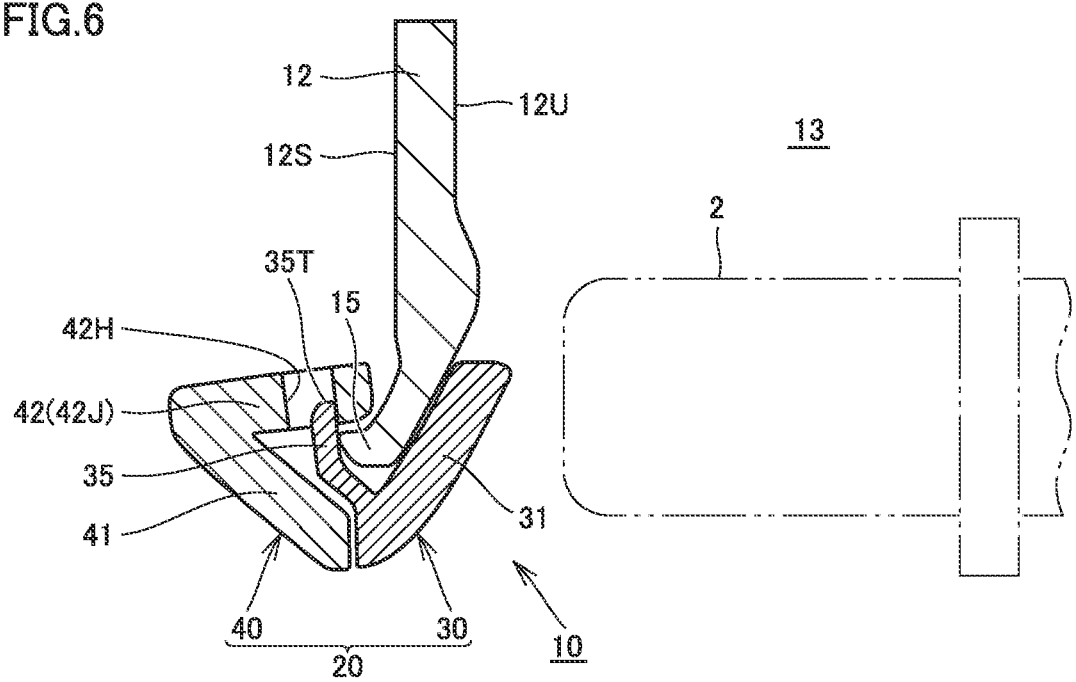
FIG. 6 is a cross sectional view taken along a VI-VI line in FIG. 2.
Figure 7:
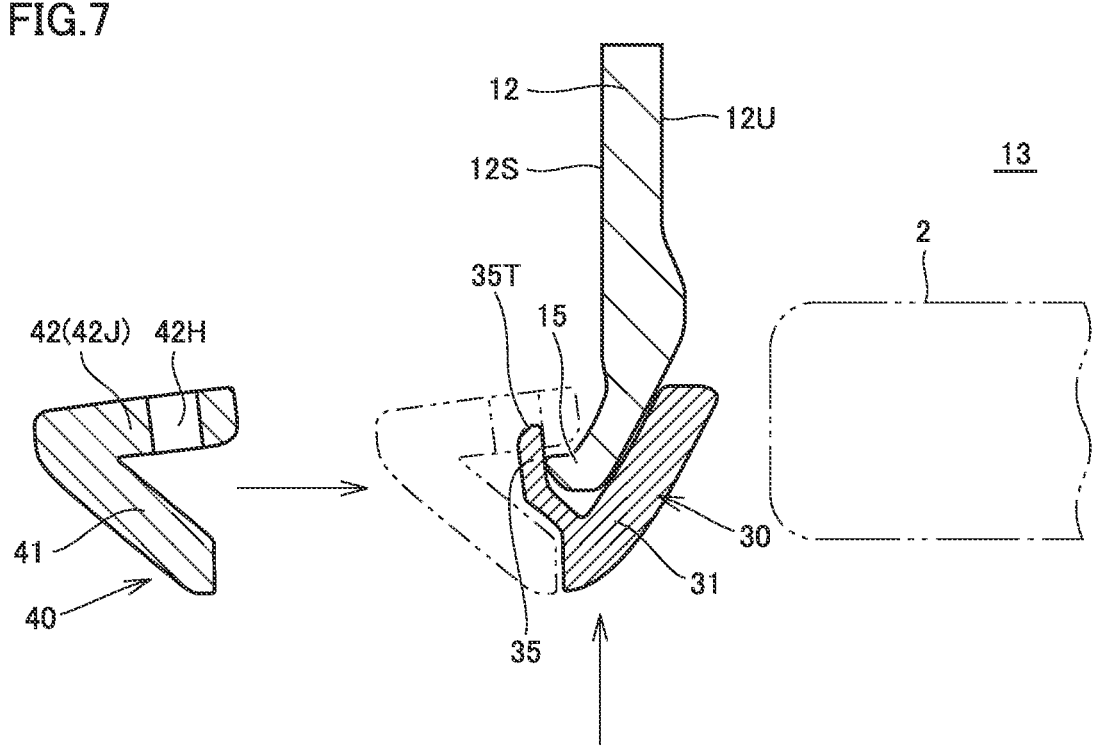
FIG. 7 is a cross sectional view showing that the outer panel is removed from the edge portion (outer surface) of the retainer in the mounting structure shown in FIG. 6.
Figure 8:
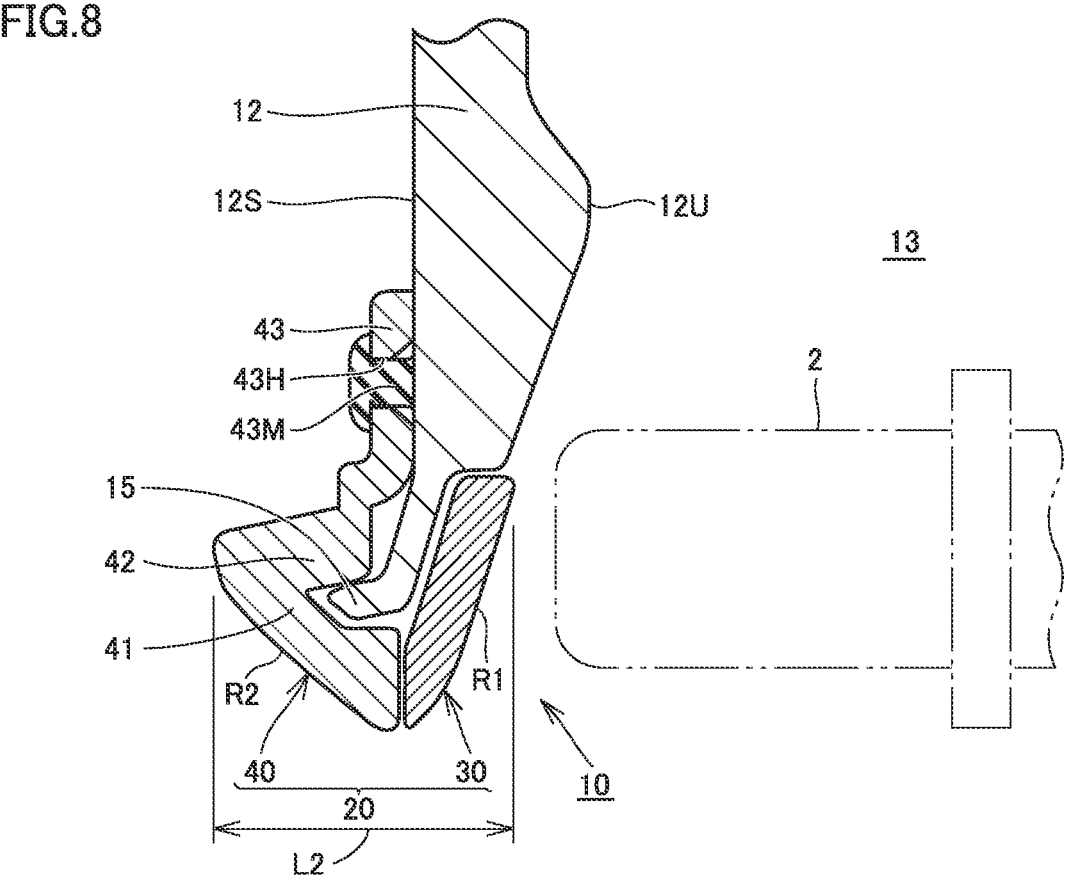
FIG. 8 is a cross sectional view taken along a VIII-VIII line in FIG. 2.
Figure 9:
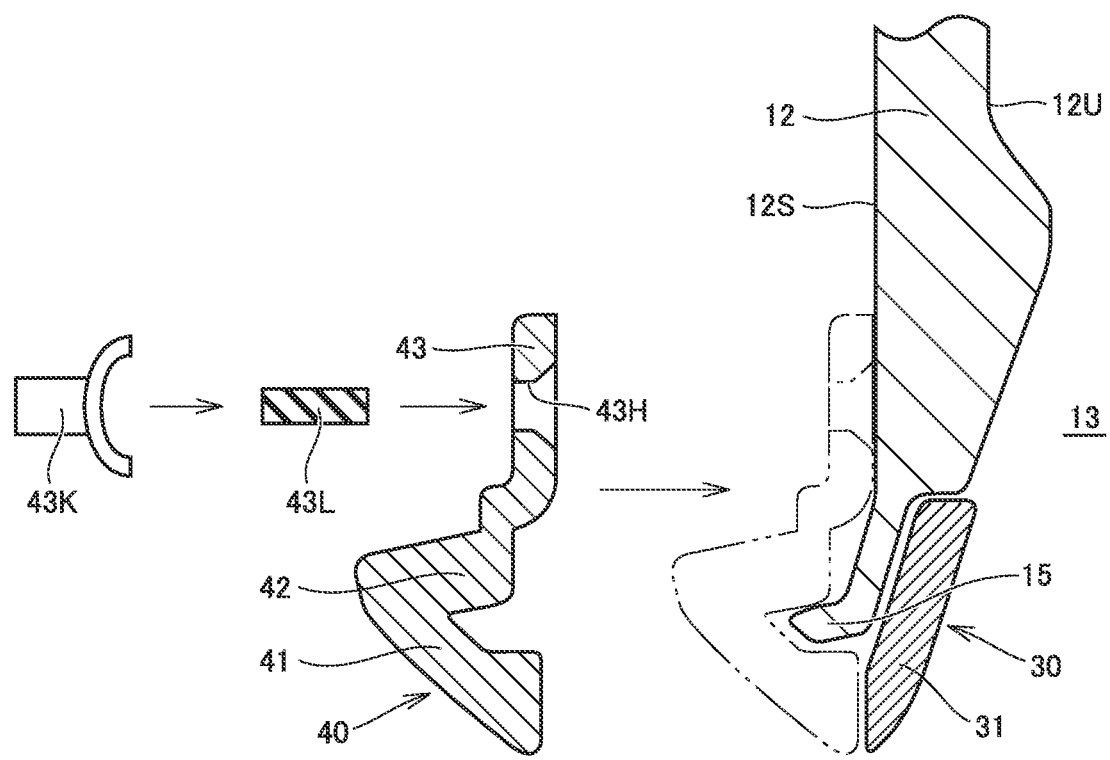
FIG. 9 is a cross sectional view showing that the outer panel is removed from the edge portion (outer surface) of the retainer in the mounting structure shown in FIG. 8.
Figure 10:
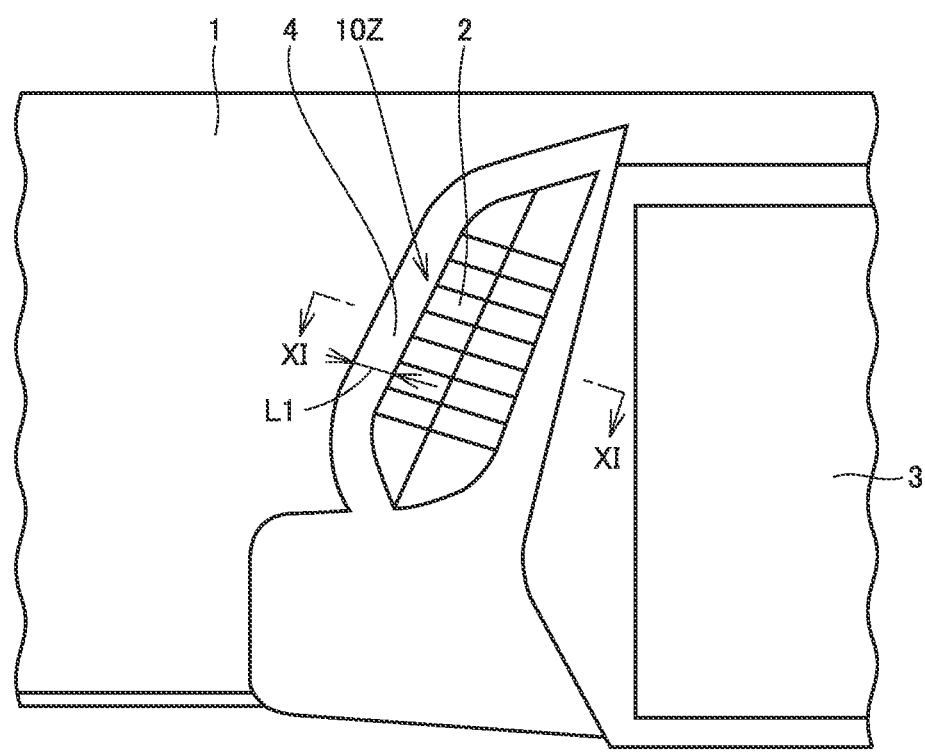
FIG. 10 shows a general mounting structure for a register panel when viewed from a front side.
Figure 11:
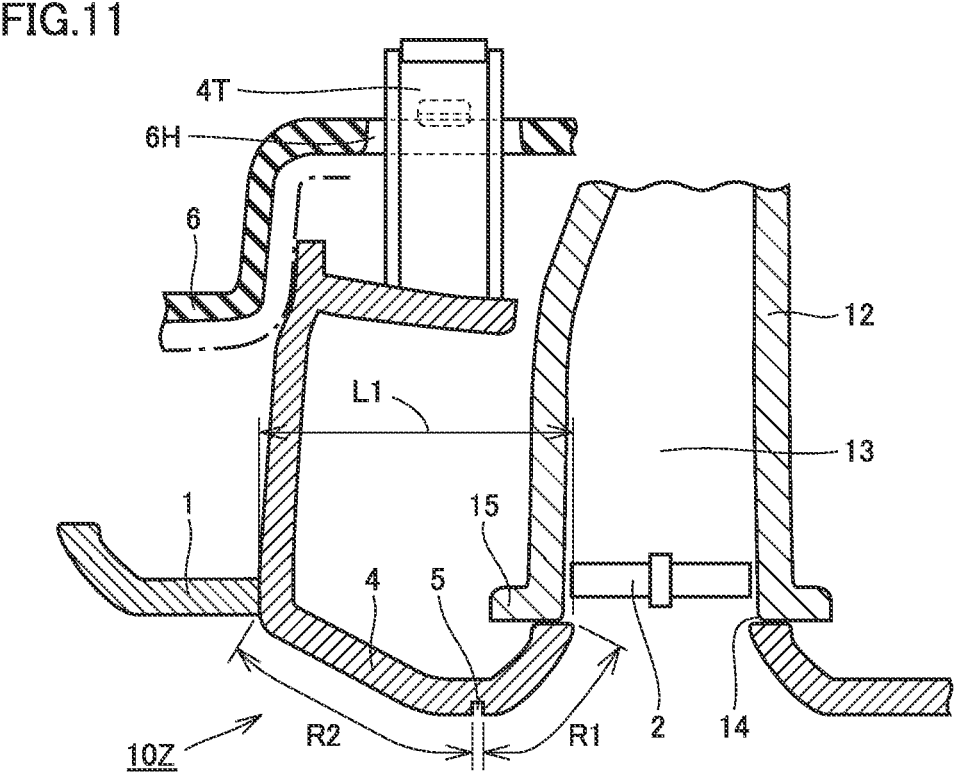
FIG. 11 is a cross sectional view taken along a XI-XI line in FIG. 10.

FIG. 6 is a cross sectional view taken along a VI-VI line in FIG. 2. FIG. 7 is a cross sectional view showing that the outer panel 40 is removed from the edge portion 15 (outer surface 12S) of the retainer 12 in the mounting structure 10 shown in FIG. 6. FIG. 8 is a cross sectional view taken along a VIII-VIII line in FIG. 2. FIG. 9 is a cross sectional view showing that the outer panel 40 is removed from the edge portion 15 (outer surface 12S) of the retainer 12 in the mounting structure 10 shown in FIG. 8.

(Inner Panel 30)

With reference to FIG. 3 mainly, the inner panel 30 has a lengthwise C-like shape as a whole. The inner panel 30 is curved in conformity with the shape of the one portion 15L of the edge portion 15 of the retainer 12 in the circumferential direction. Specifically, the inner panel 30 includes a main body portion 31 and engagement pieces 32, 33, 34, 35. The main body portion 31 has a shape in the form of a thin plate. When viewed from the edge portion 15 (one portion 15L) of the retainer 12, the main body portion 31 is disposed at the side at which the opening 14 is located (the inner side of the retainer 12) (see also FIG. 4 to FIG. 9).

(First Engagement Piece)

The engagement pieces 33, 34 can be provided at any locations of the inner panel 30 in the circumferential direction (longitudinal direction). The engagement pieces 33, 34 are formed to protrude from the main body portion 31 of the inner panel 30 toward the forward side (see FIG. 3 to FIG. 5). The "forward side" herein refers to the forward side in the vehicle forward/rearward direction when the register panel 20 (inner panel 30) is mounted at the edge portion 15 (one portion 15L) of the retainer 12. The engagement pieces 33, 34 can function as a first engagement piece.

The retainer 12 has openings 16, 17 configured to receive the engagement pieces 33, 34 (see FIG. 2 to FIG. 5). The opening 16, 17 are provided at locations inwardly of the edge portion 15 and near the edge portion 15. When the engagement piece 33 functions as the first engagement piece, the opening 16 functions as a first opening. When the engagement piece 34 functions as the first engagement piece, the opening 17 functions as the first opening. One of the engagement pieces 33, 34 may function as the first engagement piece or both the engagement pieces 33, 34 may function as the first engagement piece, although they are not essential configurations in the present embodiment.

At each of the forward sides of the openings 16, 17, a protrusion (see a protrusion 12G shown in FIG. 4 and FIG. 5) is provided. Each of the engagement pieces 33, 34 has a recess (recess 34T) corresponding to the shape of the protrusion (protrusion 12G). After inserting the engagement pieces 33, 34 into the openings 16, 17, the protrusions (protrusions 12G) and the recesses (recesses 34T) are engaged with each other, whereby the inner panel 30 can be temporarily fixed to the edge portion 15 of the retainer 12.

(Second Engagement Piece)

With reference to FIG. 3, FIG. 6, and FIG. 7, the engagement pieces 32, 35 also can be provided at any locations of the inner panel 30 in the circumferential direction (longitudinal direction). Also, the engagement pieces 32, 35 are formed to protrude from the main body portion 31 of the inner panel 30 toward the forward side. As with the engagement piece 35 shown in FIG. 6 and FIG. 7, the engagement pieces 32, 35 (FIG. 3) are disposed opposite to the side at which the opening 14 is located (the outer side of the retainer 12) when viewed from the edge portion 15. The main body portion 31 and the engagement pieces 32, 35 exhibit a substantially V-like shape when viewed in a cross section (FIG. 6 and FIG. 7).

The engagement piece 32 is engaged with the edge portion 15 (one portion of the edge portion 15 in the circumferential direction) of the retainer 12 located between the main body portion 31 and the engagement piece 32. Likewise, the engagement piece 35 is engaged with the edge portion 15 (one portion of the edge portion 15 in the circumferential direction) located between the main body portion 31 and the engagement piece 35. By the engagement, relative movement of the inner panel 30 to the retainer 12 (edge portion 15) in the vehicle width direction (the left/right direction in the plane of sheet of each of FIG. 6 and FIG. 7) is regulated.

(Outer Panel 40)

With reference to FIG. 3 mainly, the outer panel 40 also has a lengthwise C-like shape as a whole. The outer panel 40 is also curved in conformity with the shape of the one portion 15L (see FIG. 3) of the edge portion 15 of the retainer 12 in the circumferential direction.

Specifically, the outer panel 40 has a main body portion 41, folding portions 42, and extending portions 43, 44. The main body portion 41 has a shape in the form of a thin plate. When viewed from the edge portion 15 of the retainer 12, the main body portion 41 is disposed opposite to the side at which the opening 14 is located (the outer side of the retainer 12) (see also FIG. 4 to FIG. 9).

(Extending Portion)

As shown in FIG. 3, FIG. 8, and FIG. 9, each of the extending portions 43, 44 of the outer panel 40 has a shape in the form of a thin plate extending along the shape of the outer surface 12S of the retainer 12. The extending portions 43, 44 respectively have openings 43H, 44H (FIG. 3), through which welding tools (see a welding tool 43L in FIG. 9) are to be inserted.

The main body portion 41 and the folding portion 42 exhibit a substantially C-like shape when viewed in a cross section. The outer panel 40 is applied onto the edge portion 15 of the retainer 12 (see FIG. 9), with the inner panel 30 engaged with (temporarily fixed to) the edge portion 15 of the retainer 12, such that the edge portion 15 is located between the main body portion 41 and the folding portion 42.

The welding tools 43L (FIG. 9) are inserted in each of the openings 43H, 44H (FIG. 3) provided in the extending portions 43, 44, and, in that state, the welding tools 43L are melted and hardened using a welding device 43K. Welded portions 43M, 44M (FIG. 2 and FIG. 8) are formed, thereby welding the extending portions 43, 44 to the outer surface 12S of the retainer 12. Accordingly, the outer panel 40 can be mounted at the outer surface 12S of the retainer 12 via the extending portions 43, 44.

(Second Engagement Piece)

With reference to FIG. 6 and FIG. 7 again, here, as a preferred embodiment, the outer panel 40 of the present embodiment is provided with openings (see openings 42H in FIG. 6 and FIG. 7). The openings (openings 42H) are provided in the folding portions 42 (42J, 42K) (see FIG. 3). The openings 42H provided in the folding portions 42 (42J, 42K) receive the engagement pieces 32, 35 of the inner panel 30, thus engaging with the engagement pieces 32, 35. The engagement pieces 32, 35 can function as the second engagement piece. The openings 42H provided in the folding portions 42 (42J, 42K) can function as a second opening.

When the engagement piece 32 functions as the second engagement piece, the opening 42H provided in the folding portion 42 (42K) functions as the second opening.

When the engagement piece 35 functions as the second engagement piece, the opening 42H provided in the folding portion 42 (42J) functions as the second opening. One of the engagement pieces 32, 35 may function as the second engagement piece or both the engagement pieces 32, 35 may function as the second engagement piece, although they are not essential configurations in the present embodiment.

For example, before the welding step, the inner panel 30 is engaged with the edge portion 15 of the retainer 12. In this state (in the state of temporary fixation), the outer panel 40 is applied onto the edge portion 15 of the retainer 12 such that the edge portion 15 is located between the main body portion 41 and the folding portion 42 of the outer panel 40 (see FIG. 7). Tips 32T, 35T (FIG. 3) of the engagement pieces 32, 35 are inserted into the openings 42H. The openings 42H provided in the folding portions 42 (42J, 42K) of the outer panel 40 are to engage with the engagement pieces 32, 35 of the inner panel 30.

Due to the engagement of the engagement pieces 32, 35 with the openings 42H, the inner panel 30 and the outer panel 40 sandwich the one portion 15L of the edge portion 15 of the retainer 12 in the circumferential direction. Accordingly, the extending portions 43, 44 of the outer panel 40 can be readily welded to the outer surface 12S of the retainer 12.

With reference to FIG. 8, as a preferred embodiment, the surface portion R1 of the inner panel 30 exposed at the front side, and the surface portion R2 of the outer panel 40 exposed at the front side may be configured to have different colors and patterns.

(Function and Effect)

According to the above configuration, the register panel 20 includes the inner panel 30 and the outer panel 40, which are configured as different members. Before assembling the panels, the color of the inner panel 30 can be made different from the color of the outer panel 40 in advance as required, whereby the colors of the surface portions R1, R2 of the register panel 20 at the front side can be different from each other. The same applies to a case where the inner panel 30 and the outer panel 40 have different patterns.

No parting line in the form of a groove needs to be deliberately provided in the surface portions R1, R2 of the register panel 20 (the inner panel 30 and the outer panel 40) located at the front side. It should be noted that the parting line may be provided in the surface portions R1, R2 of the register panel 20 (the inner panel 30 and the outer panel 40) as required. The description "no parting line needs to be deliberately provided" herein is not intended to exclude, from the technical scope of the present invention, the configuration in which the parting line in the form of a groove is provided in the surface portions R1, R2 of the register panel 20 (the inner panel 30 and the outer panel 40) located at the front side.

In the present embodiment, the design portion (the surface portions R1, R2) of the register panel 20 (the inner panel 30 and the outer panel 40) at the front side has a width having substantially a size L2 (see FIG. 8) in the vehicle width direction. In the present embodiment, unlike the mounting structure 10Z described at the beginning, the outer panel 40 is joined to the outer surface 12S of the retainer 12 by welding.

In the present embodiment, the structure of engagement of the inner panel 30 with the retainer 12, the structure of engagement of the inner panel 30 with the outer panel 40, and the structure of welding of the outer panel 40 to the outer surface 12S of the retainer 12 work organically to establish the following relation: "the size L2<the size L1". Accordingly, the register panel can be thinned in the vehicle width direction.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A register panel mounting structure comprising:
    a retainer having a cylindrical shape and having a flow path formed therein to permit passage of air for air conditioning; and
    a register panel mounted at an edge portion of the retainer, the edge portion forming an opening at a downstream side of the flow path and having the circumferential shape of the retainer,
    the register panel having a shape only covering, from a front side, one portion of the edge portion in a circumferential direction of the cylindrical shape,
    the register panel including
        an inner panel disposed at a side at which the opening is located when viewed from the edge portion, wherein the inner panel has a C-shape that curves in conformity with the one portion of the edge portion of the retainer in the circumferential direction, and
        an outer panel disposed opposite to the side at which the opening is located when viewed from the edge portion,
    the inner panel and the outer panel sandwiching the one portion of the edge portion in the circumferential direction, wherein
    the inner panel has:
        a main body portion disposed at an inner side of the opening of the retainer; and
        an engagement piece protruding from the main body portion in a direction toward an upstream side of the flow path, and disposed at an outer side of the opening of the retainer, wherein a portion of the edge portion of the retainer is located between the main body portion and the engagement piece, and the portion of the edge portion engages with the engagement piece, and
    the outer panel is provided with an opening and a tip of the engagement piece is disposed in the opening of the outer panel.

2. The register panel mounting structure according to claim 1, wherein
    the outer panel has an extending portion extending along an outer surface of the retainer, and
    the extending portion is welded to the outer surface of the retainer.

3. The register panel mounting structure according to claim 1, wherein
    the inner panel has another engagement piece protruding from the main body portion in a direction toward an upstream side of the flow path, wherein the another engagement piece has an opening,
    the retainer is provided with another opening configured to receive the another engagement piece, and
    a protrusion is provided at an upstream side of the another opening, so that the protrusion engages with the opening of the another engagement piece when the another engagement piece is received in the another opening of the retainer.

4. The register panel mounting structure according to claim 1, wherein a surface portion of the inner panel exposed at the front side and a surface portion of the outer panel exposed at the front side have different colors.

* * * * *